US008955716B2

(12) United States Patent
Penny et al.

(10) Patent No.: US 8,955,716 B2
(45) Date of Patent: Feb. 17, 2015

(54) MOLDED PREFORM AND CONTAINER HAVING INTEGRATED POUR SPOUT

(75) Inventors: Michael E. Penny, Saline, MI (US); Christopher Howe, Belleville, MI (US); Luke A. Mast, Brooklyn, MI (US); Frederick C. Beuerle, Jackson, MI (US)

(73) Assignee: Amcor Limited, Hawthorn (AU)

( * ) Notice: Subject to any disclaimer, the term of this patent is extended or adjusted under 35 U.S.C. 154(b) by 53 days.

(21) Appl. No.: 12/940,367

(22) Filed: Nov. 5, 2010

(65) Prior Publication Data

US 2011/0089195 A1   Apr. 21, 2011

Related U.S. Application Data

(63) Continuation-in-part of application No. 11/804,406, filed on May 17, 2007, now Pat. No. 8,177,098.

(51) Int. Cl.
*B67D 1/16* (2006.01)
*B29B 11/14* (2006.01)
(Continued)

(52) U.S. Cl.
CPC .............. *B29B 11/14* (2013.01); *B65D 1/023* (2013.01); *B29B 11/08* (2013.01); *B29B 2911/1402* (2013.01); *B29B 2911/14026* (2013.01); *B29B 2911/14033* (2013.01); *B29B 2911/1404* (2013.01); *B29B 2911/14053* (2013.01); *B29B 2911/14066* (2013.01); *B29B 2911/1408* (2013.01); *B29B 2911/14093* (2013.01); *B29B 2911/14106* (2013.01); *B29B 2911/14113* (2013.01); *B29B 2911/14133* (2013.01);
(Continued)

(58) Field of Classification Search
USPC .......... 425/525, 577, 529; 264/523, 531–532, 264/537, 539; 222/109–111, 566–574
See application file for complete search history.

(56) References Cited

U.S. PATENT DOCUMENTS 2,069,089 A * 1/1937 Goldman et al. ............. 220/703
2,601,039 A    6/1952 Gould
(Continued)

FOREIGN PATENT DOCUMENTS

EP      0329883     8/1989
KR   1019970005065   4/1997
(Continued)

OTHER PUBLICATIONS

International Search Report and Written Opinion dated Jun. 29, 2012 in corresponding PCT International Patent Application No. PCT/US2011/057806 (eight pages).

*Primary Examiner* — Paul R Durand
*Assistant Examiner* — Andrew P Bainbridge
(74) *Attorney, Agent, or Firm* — Harness, Dickey & Pierce, P.L.C.

(57) ABSTRACT

A one-piece plastic container includes a body defining a longitudinal axis and having an upper portion, a sidewall portion and a base portion. The upper portion has a spout defining an opening into the container and a finish offset radially outwardly from the spout. A trough defines a passage into the body. The trough slopes toward the passage and defines a non-orthogonal angle relative to the longitudinal axis. According to other features, the sidewall portion is integrally formed with and extends from the upper portion to the base portion. The base portion closes off an end of the container. The finish defines a means, such as at least one thread, for attaching a closure thereon.

40 Claims, 14 Drawing Sheets

(51) Int. Cl.
*B65D 1/02* (2006.01)
*B29B 11/08* (2006.01)
*B29C 49/06* (2006.01)
*B29C 49/12* (2006.01)
*B29K 23/00* (2006.01)
*B29K 67/00* (2006.01)
*B29K 105/00* (2006.01)
*B29L 31/00* (2006.01)

(52) U.S. Cl.
CPC ............... *B29B2911/1414* (2013.01); *B29B 2911/14326* (2013.01); *B29B 2911/1442* (2013.01); *B29B 2911/1444* (2013.01); *B29B 2911/14533* (2013.01); *B29B 2911/14606* (2013.01); *B29B 2911/14666* (2013.01); *B29B 2911/14713* (2013.01); *B29B 2911/14726* (2013.01); *B29B 2911/14853* (2013.01); *B29B 2911/1486* (2013.01); *B29B 2911/14873* (2013.01); *B29C 49/06* (2013.01); *B29C 49/12* (2013.01); *B29K 2023/065* (2013.01); *B29K 2023/12* (2013.01); *B29K 2067/00* (2013.01); *B29K 2067/046* (2013.01); *B29K 2105/258* (2013.01); *B29L 2031/7158* (2013.01)
USPC ........... 222/109; 222/571; 222/572; 425/529; 264/532

(56) References Cited

U.S. PATENT DOCUMENTS

| | | | | |
|---|---|---|---|---|
| 2,601,040 | A | | 6/1952 | Gould |
| 2,743,844 | A | | 5/1956 | Livingstone |
| 2,763,403 | A | * | 9/1956 | Livingstone ................. 222/111 |
| 3,309,000 | A | * | 3/1967 | Haverstick ................... 222/569 |
| 4,550,862 | A | | 11/1985 | Barker et al. |
| 4,640,855 | A | * | 2/1987 | St. Clair ....................... 222/572 |
| 4,844,302 | A | | 7/1989 | Lay |
| 4,917,268 | A | | 4/1990 | Campbell et al. |
| 4,964,527 | A | * | 10/1990 | Martin ......................... 220/698 |
| 4,984,714 | A | * | 1/1991 | Sledge ......................... 222/109 |
| 4,989,757 | A | | 2/1991 | Krall |
| 5,071,037 | A | | 12/1991 | Moore et al. |
| 5,078,288 | A | * | 1/1992 | Fuchs .......................... 215/209 |
| 5,114,659 | A | | 5/1992 | Krall |
| 5,207,336 | A | * | 5/1993 | Tyler ............................ 211/183 |
| 5,207,356 | A | | 5/1993 | Krall |
| 5,330,083 | A | | 7/1994 | Bartimes et al. |
| 5,435,467 | A | | 7/1995 | Ekkert et al. |
| 5,522,519 | A | | 6/1996 | Bergner et al. |
| 5,988,460 | A | | 11/1999 | Brecheisen et al. |
| 6,123,231 | A | * | 9/2000 | Geisinger .................... 222/109 |
| 6,209,762 | B1 | * | 4/2001 | Haffner et al. ............... 222/570 |
| 6,213,665 | B1 | * | 4/2001 | Degoix et al. ................ 401/209 |

FOREIGN PATENT DOCUMENTS

| | | |
|---|---|---|
| WO | WO2008/143853 | 11/2008 |
| WO | WO2010/054059 | 5/2010 |

* cited by examiner

MOLDED PREFORM AND CONTAINER HAVING INTEGRATED POUR SPOUT

CROSS-REFERENCE TO RELATED APPLICATION

This application is a continuation-in-part of U.S. patent application Ser. No. 11/804,406 filed on May 17, 2007, now U.S. Pat. No. 8,177,098, issued on May 15, 2012. The entire disclosure of the above-mentioned application is incorporated herein by reference.

TECHNICAL FIELD

This disclosure generally relates to plastic containers for retaining a commodity, such as a solid or liquid commodity. More specifically, this disclosure relates to a one-piece blown container having a pour spout arranged at an angle relative to a longitudinal axis of the container.

BACKGROUND

As a result of environmental and other concerns, plastic containers, such as polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material; $\rho_a$ is the density of pure amorphous PET material (1.333 g/cc); and $\rho_c$ is the density of pure crystalline material (1.455 g/cc).

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

Typically, an upper portion of the plastic container defines an opening. This upper portion is commonly referred to as a finish and includes some means for engaging a cap or closure to close off the opening. In the traditional injection-stretch blow molding process, the finish remains substantially in its injection molded state while the container body is formed below the finish. The finish may include at least one thread extending radially outwardly around an annular sidewall defining a thread profile. In one application, a closure member or cap may define a complementary thread, or threads, that are adapted to cooperatively mate with the threads of the finish.

In some applications, it is desirable to provide a spout at the opening of the container. In one example, a spout may be formed as a secondary component and subsequently connected to a container after the container has been blown. Such independently made pour spouts can improve pouring from heavy or awkward to hold container designs. In some examples, a drip back feature can be incorporated into the pour spout that allows the consumer to pour into and dispense from the corresponding cap yet still ensure all of the cap's remaining contents drip back inside the container during cap reapplication.

In many instances, the spout, once connected to the container, may define an angle relative to a longitudinal axis of the container to facilitate pouring. While a container having an angled spout improves functionality of the container such as during pouring, the two-piece design requires significant material and manufacturing costs. Thus, there is a need for a one-piece container design that has a pourable spout feature incorporated into the finish of the container.

SUMMARY

Accordingly, the present disclosure provides a one-piece plastic container having a body defining a longitudinal axis and having an upper portion, a sidewall portion, and a base portion. The upper portion has a spout defining an opening into the container and a finish offset radially outwardly from the spout. A trough defines a passage into the body. The trough slopes toward the passage and defines a non-orthogonal angle relative to the longitudinal axis. Such a one-piece plastic container minimizes material, reduces manufacturing cycle time by reducing processing and assembly, and maintains structure integrity.

According to other features, the sidewall portion is integrally formed with and extends from the upper portion to the base portion. The base portion closes off an end of the container. The finish defines a means, such as at least one thread, for attaching a closure thereon.

According to yet other features, the spout includes a terminal lip defining a plane that extends generally perpendicularly to the longitudinal axis. The terminal lip is offset entirely above the finish in a direction away from the base. The spout defines a longitudinal slot extending from the terminal lip to the passage. The terminal lip transitions to the longitudinal slot along arcuate surfaces. The trough defines a first angle relative to a transverse line drawn through the container from the longitudinal axis to the passage. The trough defines a second angle relative to the transverse line from the longitudinal axis to a diametrically opposed point relative to the passage. The first angle can be greater than the second angle. The first angle can be about ten (10) degrees or less, and the second angle can be about two (2) degrees.

Additional benefits and advantages of the present disclosure will become apparent to those skilled in the art to which the present disclosure relates from the subsequent description and the appended claims, taken in conjunction with the accompanying drawings. It will also be appreciated by those skilled in the art to which the present disclosure relates that the container of the present disclosure may be manufactured utilizing alternative blow molding processes to those disclosed above.

DETAILED DESCRIPTION

The following description is merely exemplary in nature, and is in no way intended to limit the disclosure or its application or uses. The term "one-piece" or "continuous" as used herein, means that the preform or the container is made of one continuous piece of material, without the need for joining by welding, adhesive, heat seals, mechanical means, or other processes. The term "multi-piece" as used herein, means that the preform or the container is made of more than one piece of material.

Figure 1:
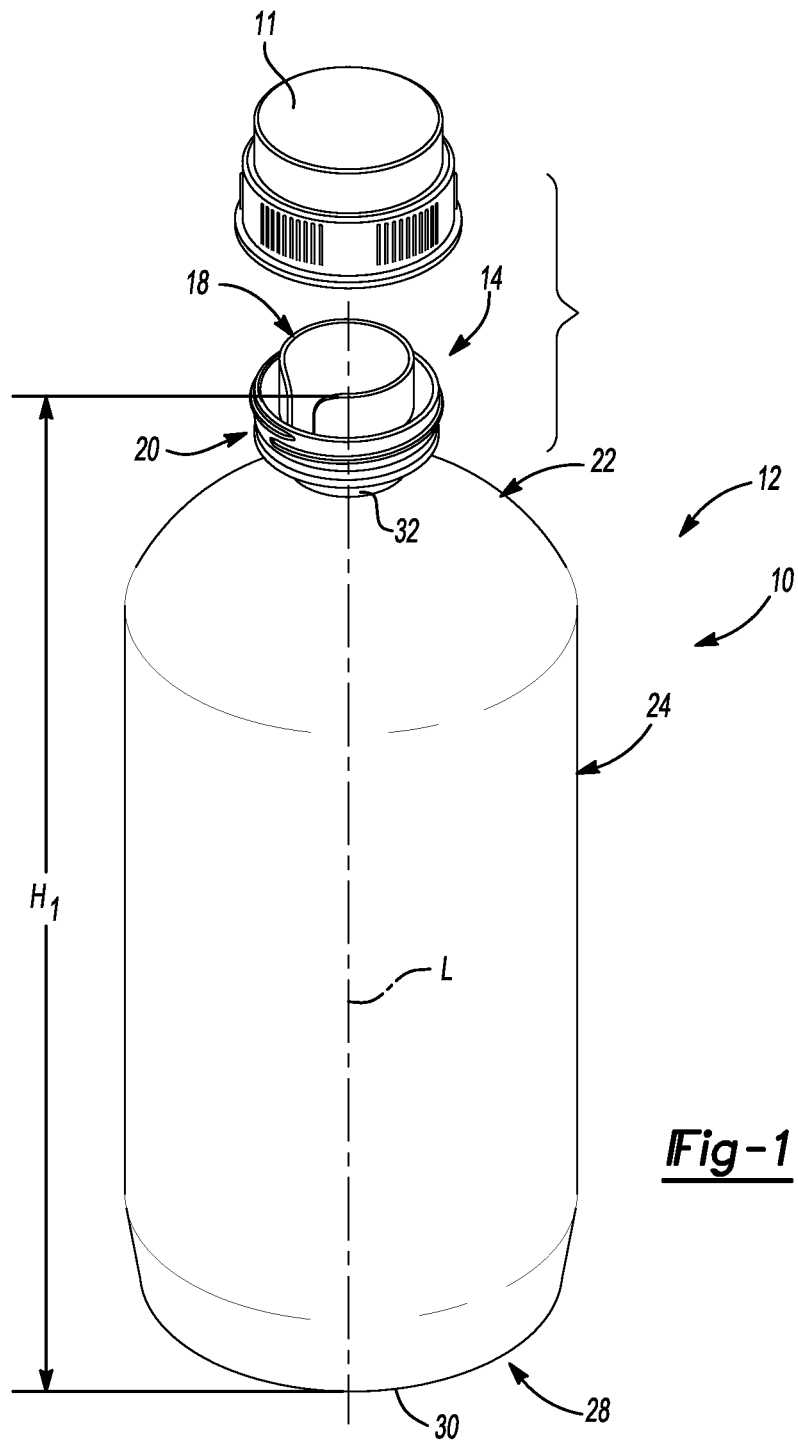
FIG. 1 is a side elevational view of a one-piece plastic container constructed in accordance with the teachings of the present disclosure and shown with an exemplary cap.
Figure 2:
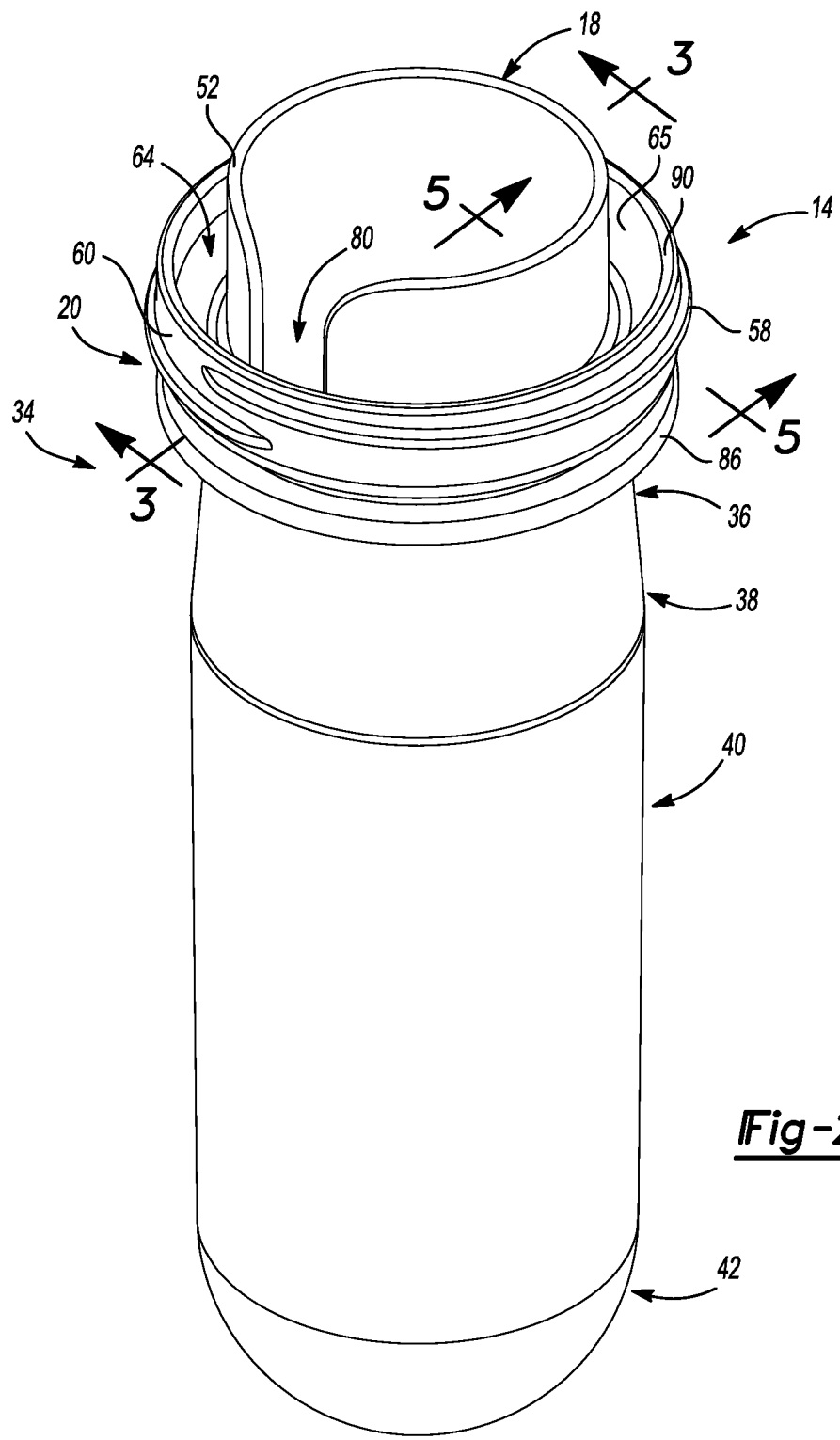
FIG. 2 is a perspective view of a preform used for construction of the one-piece plastic container of FIG. 1.
Figure 3:
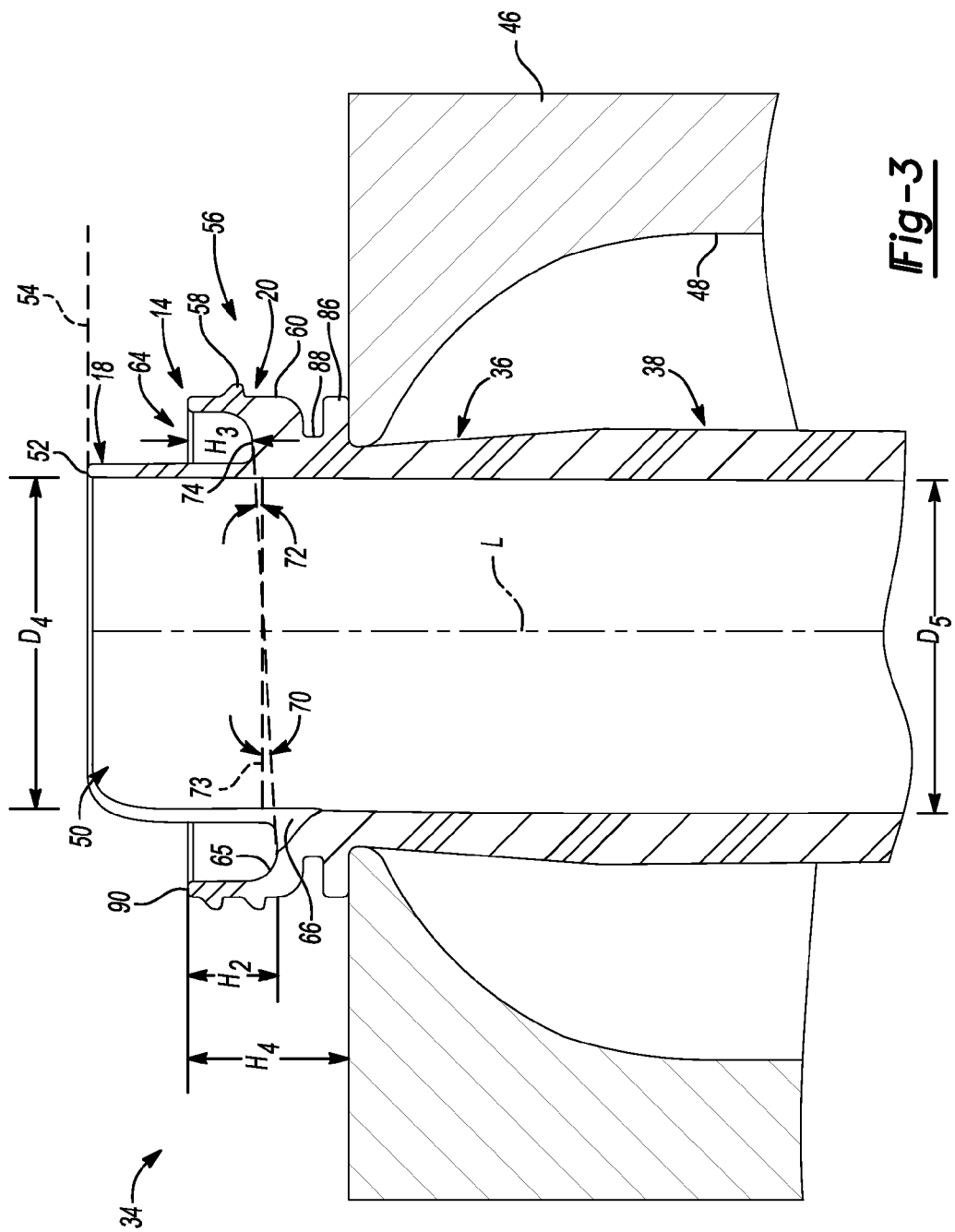
FIG. 3 is a sectional view of the preform taken along line 3-3 of FIG. 2 and shown positioned in an exemplary mold cavity used during formation of the container of FIG. 1.

FIGS. 1-3 show one preferred embodiment of the present container. In the Figures, reference number 10 designates a one-piece plastic, e.g. polyethylene terephthalate (PET), container. As shown in FIG. 1, the plastic container 10 has an overall height $H_1$ of about 292.68 mm (11.52 inches). The container is shown with an exemplary cap 11. The plastic container 10 can define a longitudinal axis L and be substantially cylindrical in cross section. In this particular embodiment, the plastic container 10 has a volume capacity of about one (1) liter (1000 cc). Those of ordinary skill in the art would appreciate that the following teachings of the present disclosure are applicable to other containers, such as rectangular, triangular, hexagonal, octagonal or square shaped containers, which may have different dimensions and volume capacities. It is also contemplated that other modifications can be made depending on the specific application and environmental requirements.

As shown in FIG. 1, the one-piece plastic container 10 according to the present teachings defines a body 12, and includes an upper portion 14 having a spout 18 and a finish 20. Integrally formed with the finish 20 and extending downward therefrom is a shoulder region 22. The shoulder region 22 merges into and provides a transition between the finish 20 and a sidewall portion 24. The sidewall portion 24 extends downward from the shoulder region 22 to a base portion 28 having a base 30.

A neck 32 may also be included having an extremely short height, that is, becoming a short extension from the finish 20, or an elongated height, extending between the finish 20 and the shoulder region 22. The plastic container 10 has been designed to retain a commodity. The commodity may be in any form such as a solid or liquid product. In one example, a liquid commodity may be introduced into the container during a thermal process, typically a hot-fill process. For hot-fill bottling applications, bottlers generally fill the plastic container 10 with a liquid or product at an elevated temperature between approximately 155° F. to 205° F. (approximately 68° C. to 96° C.) and seal the plastic container 10 with the cap or closure 11 before cooling. In addition, the plastic container 10 may be suitable for other high-temperature pasteurization or retort filling processes or other thermal processes as well. In another example, the commodity may be introduced into the plastic container 10 under ambient temperatures.

The plastic container 10 of the present disclosure is an injection-stretch blow molded, biaxially oriented container with a unitary construction from a single or multi-layer material. A well-known stretch-molding, heat-setting process for making the one-piece plastic container 10 generally involves the manufacture of a preform 34 (FIG. 2) of a polyester material, such as polyethylene terephthalate (PET), having a shape well-known to those skilled in the art similar to a test-tube with a generally cylindrical cross section and a length typically approximately fifty percent (50%) that of the resultant container height. In one example, the preform 34 can be injection molded. As will be appreciated, the upper portion 14 (i.e. the spout 18 and the finish 20), remains substantially unchanged from its preform state while the container body 12 is formed below the finish 20. For reference purposes, features of the upper portion 14 have been described interchangeably for the plastic container 10 and the preform 34. An exemplary method of manufacturing the plastic container 10 will be described in greater detail below.

Turning now to FIGS. 2-7, the preform 34 will be further described. The preform 34 generally includes the upper portion 14, a neck-forming region 36, a shoulder-forming region 38, a sidewall-forming region 40 and a base-forming region 42. The preform 34 is shown placed into a mold cavity 46 in FIG. 3. As mentioned above, the upper portion 14 including the spout 18 and the finish 20, of the preform 34 remains substantially unchanged during blowing, filling and shipping operations. The neck-forming region 36, the shoulder-forming region 38, the sidewall-forming region 40 and the base-forming region 42 are all expanded in the mold cavity 46 to create the neck 32 (FIG. 1), the shoulder region 22, the sidewall portion 24, and the base portion 28 of the resultant plastic container 10, respectively. While not shown in its entirety, it is appreciated that the mold cavity 46 defines a mold surface 48 conforming to the shape of the resultant plastic container 10.

The upper portion 14 will now be further described. The spout 18 includes a terminal lip 52 that defines an opening 50 into the preform 34 (and likewise into the resultant plastic container 10). The terminal lip 52 can define a plane 54 (FIG. 3) that extends substantially perpendicularly to the longitudinal axis L. In other examples, the spout 18 may define an angle relative to the base 30. The spout 18 assists in channeling, funneling and/or metering the commodity as it is poured from the plastic container 10 through the opening 50. The finish 20 of the plastic container 10 includes a threaded region 56 having at least one thread 58 formed on an annular sidewall 60. The threaded region 56 provides a means for attachment of a similarly threaded closure or cap (i.e. cap 11, FIG. 1). The exemplary cap 11 defines at least one thread (not shown) formed around an inner diameter for cooperatively riding along the thread 58 of the finish 20. Alternatives may include other suitable devices that engage the finish 20 of the plastic container 10. Accordingly, the closure or cap 11 engages the finish 20 to preferably provide a hermetical seal of the plastic container 10. The closure or cap 11 is preferably of a plastic or metal material conventional to the closure industry and suitable for subsequent thermal processing, including high temperature pasteurization and retort.

A trough 64 is formed radially at a transition between the finish 20 and the spout 18. The trough 64 defines a generally arcuate surface 65 having a passage 66 into the body 12 of the plastic container 10. In this way, contents remaining on the cap 11 after pouring may drip through the passage 66 and back into the plastic container 10, subsequent to cap reapplication. The trough 64 generally defines an angle sloped toward the passage 66. As a result, such contents can be further directed toward the passage 66 (by gravity) once in the trough 64. In one example, as shown in FIG. 3, the trough 64 can define a first angle 70 from the passage 66 to the longitudinal axis L relative to a transverse line 73 drawn through the plastic container 10. The trough 64 can define a second angle 72 from the longitudinal axis L to a diametrically opposed point 74 on the trough 64 relative to the transverse line 73. The first angle 70 can be greater than the second angle 72. In one example, the first angle 70 can be about ten (10) degrees or less, and the second angle 72 can be about two (2) degrees. In other examples, the first angle 70 can be less than or equivalent to the second angle 72. It is appreciated that other angles can be used.

A longitudinal slot 80 (FIG. 4) is formed on the spout 18 between the terminal lip 52 and the passage 66. The terminal lip 52 transitions to the longitudinal slot 80 along arcuate surfaces 82. The finish 20 may include a support ring 86. A radial channel 88 may be formed between the support ring 86 and the annular sidewall 60. The support ring 86 may be used to carry or orient the preform 34 through and at various stages of manufacture. For example, the preform 34 may be carried by the support ring 86, the support ring 86 may be used to aid in positioning the preform 34 in the mold cavity 46, or an end consumer may use the support ring 86 to carry the plastic container 10 once manufactured.

During use, the plastic container 10 may be tipped generally in a direction away from the longitudinal slot 80 thereby directing the commodity toward the terminal lip 52 when pouring. In this way, the terminal lip 52 of the spout 18 may direct the commodity in a controlled, metered manner when poured from the plastic container 10. In one example, a handle (not shown) may be provided on the sidewall portion 24 (FIG. 1) opposite the passage 66 to facilitate tipping of the plastic container 10 during pouring.

With continued reference now to FIG. 4, exemplary dimensions for the upper portion 14 will be described. It is appreciated that other dimensions may be used. A diameter $D_1$ of the spout 18 may be 32.92 mm (1.30 inch). A diameter $D_2$ of the finish 20 and the support ring 86 may be 49.68 mm (1.96 inch). A diameter $D_3$ of the radial channel 88 may be 41.68 mm (1.64 inch). A width $W_1$ of the trough 64 may be 5.97 mm (0.23 inch). A width $W_2$ of the longitudinal slot 80 may be 9 mm (0.35 inch). A width $W_3$ taken at the transition from the terminal lip 52 to the arcuate surfaces 82 may be 25 mm (0.98 inch). A radius $R_1$ of the arcuate surfaces 82 may be 8 mm (0.32 inch).

As best shown in FIG. 3, a height $H_2$ from a top 90 of the finish 20 to the trough 64 at the passage 66 may be 8.8 mm (0.35 inch). A height $H_3$ from the top 90 of the finish 20 to the trough 64 at the diametrically opposed point 74 may be 6.44 mm (0.25 inch). A height $H_4$ from the top 90 of the finish 20 to the bottom of the support ring 86 may be 15.9 mm (0.67 inch). An inner diameter $D_4$ of the opening 50 may be 32.92 mm (1.30 inch). An inner diameter $D_5$ of the preform 34 may be 32.60 mm (1.28 inch). In general, $D_4$ is greater than or equal to $D_5$, i.e. $D_4 \geq D_5$.

Figure 5:
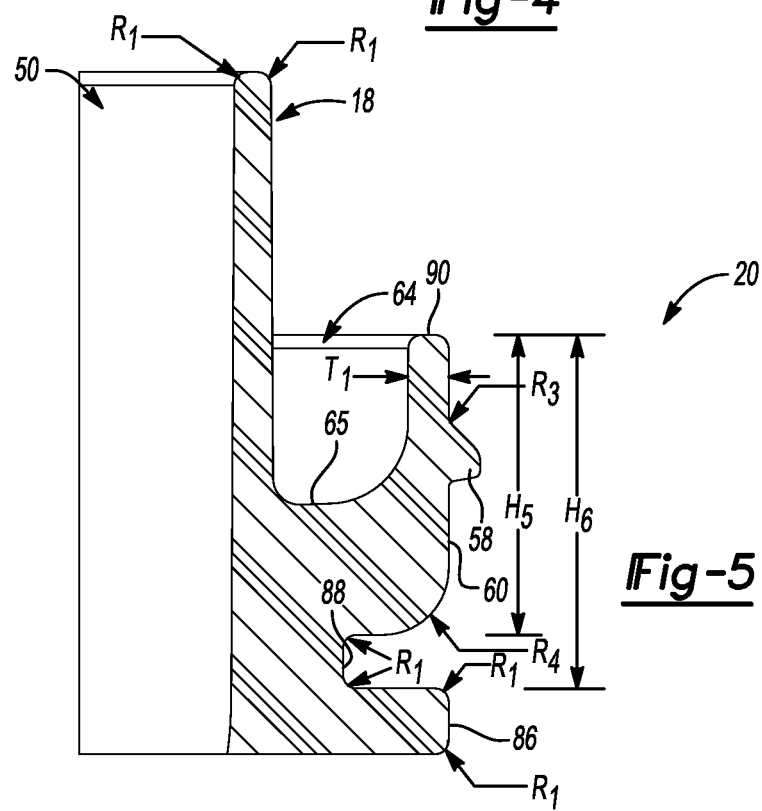
FIG. 5 is a sectional view of the upper portion taken along line 5-5 of FIG. 2.

With reference now to FIG. 5, additional exemplary dimensions for the finish 20 will be described. A height $H_5$ from the top 90 of the finish 20 to the top of the radial channel 88 may be 11.38 mm (0.45 inch). A height $H_6$ from the top 90 of the finish 20 to the top of the support ring 86 may be 13.41 mm (0.53 inch). A wall thickness $T_1$ of the finish 20 taken above the thread(s) 58 may be 1.53 mm (0.06 inch). Various radii will now be listed with exemplary dimensions. $R_1$ may be 0.51 mm (0.02 inch). $R_2$ may be 0.75 mm (0.03 inch). $R_3$ may be 0.25 mm (0.01 inch). $R_4$ may be 2.5 mm (0.10 inch).

Figure 6:
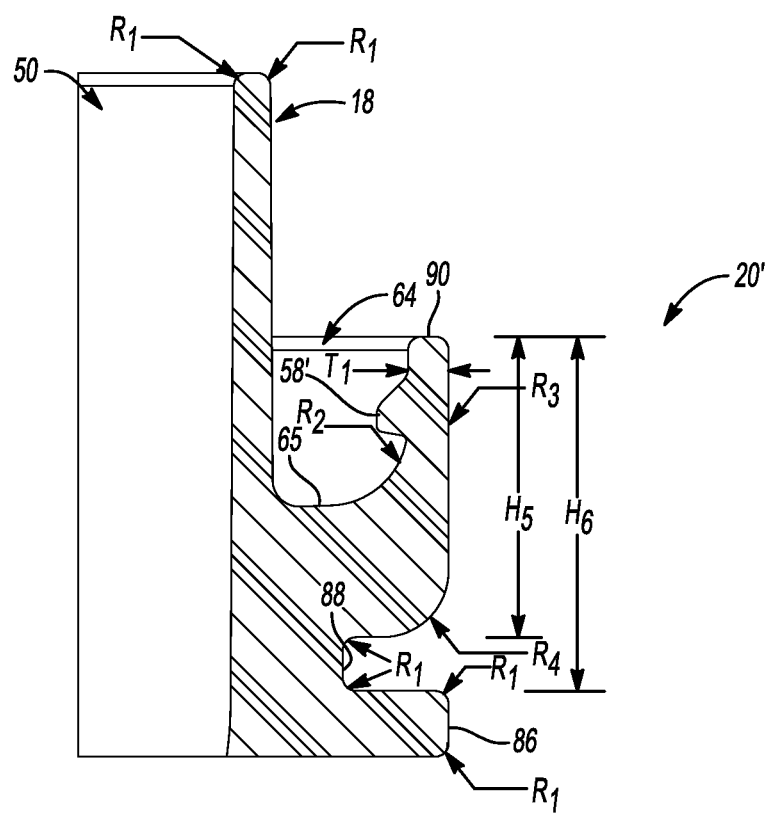
FIG. 6 is a sectional view of an upper portion according to additional features.
Figure 7:
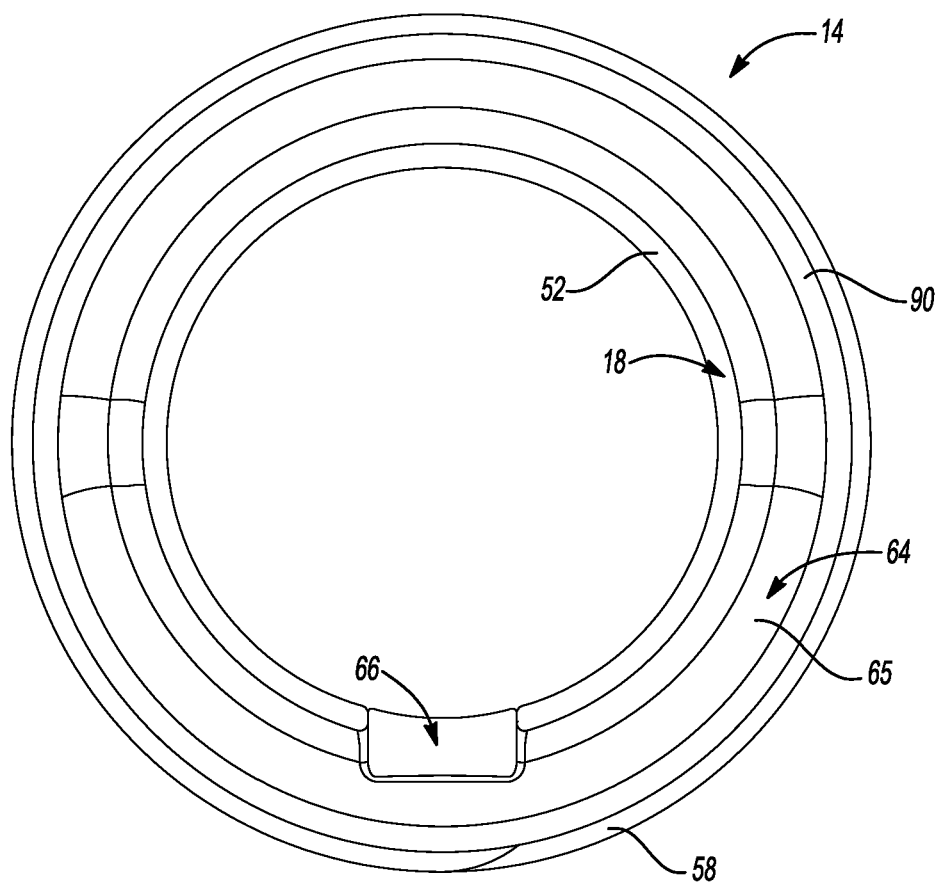
FIG. 7 is a top view of the preform of FIG. 2.

As shown in FIG. 6, a finish 20' is shown according to additional features. The finish 20' includes at least one thread 58' formed on an inner diameter thereof. As can be appreciated, a cap (not shown) can have at least one complementary thread formed on an outer diameter for engaging the thread(s) 58'.

In one example, a machine (not illustrated) places the preform 34 heated to a temperature between approximately 190° F. to 250° F. (approximately 88° C. to 121° C.) into the mold cavity 46. The mold cavity 46 may be heated to a temperature between approximately 250° F. to 350° F. (approximately 121° C. to 177° C.). A stretch rod apparatus (not illustrated) stretches or extends the heated preform 34 within the mold cavity 46 to a length approximately that of the resultant plastic container 10 thereby molecularly orienting the polyester material in an axial direction generally corresponding with the central longitudinal axis L of the plastic container 10. Again, during the stretching process, the finish 20 remains unchanged in an injection molded state while the container body 12 is formed below the finish 20. While the stretch rod extends the preform 34, air having a pressure between 300 PSI to 600 PSI (2.07 MPa to 4.14 MPa) assists in extending the preform 34 in the axial direction and in expanding the preform 34 in a circumferential or hoop direction thereby substantially conforming the polyester material to the shape of the mold cavity 46 (e.g., the mold surface 48) and further molecularly orienting the polyester material in a direction generally perpendicular to the axial direction, thus establishing the biaxial molecular orientation of the polyester material in most of the plastic container 10. The pressurized air holds the mostly biaxial molecularly oriented polyester material against the mold surface 48 of the mold cavity 46 for a period of approximately two (2) to five (5) seconds before removal of the plastic container 10 from the mold cavity 46. This process is known as heat setting and results in a heat-resistant container suitable for filling with a product at high temperatures.

In another example, a machine (not illustrated) places the preform 34 heated to a temperature between approximately 185° F. to 239° F. (approximately 85° C. to 115° C.) into the mold cavity 46. The mold cavity 46 may be chilled to a temperature between approximately 32° F. to 75° F. (approximately 0° C. to 24° C.). A stretch rod apparatus (not illustrated) stretches or extends the heated preform 34 within the mold cavity 46 to a length approximately that of the resultant plastic container 10 thereby molecularly orienting the polyester material in an axial direction generally corresponding with the central longitudinal axis L of the plastic container 10. Again, during the stretching process, the finish 20 remains unchanged in an injection molded state while the container body 12 is formed below the finish 20. While the stretch rod extends the preform 34, air having a pressure between 300 PSI to 600 PSI (2.07 MPa to 4.14 MPa) assists in extending the preform 34 in the axial direction and in expanding the preform 34 in a circumferential or hoop direction thereby substantially conforming the polyester material to the shape of the mold cavity 46 (e.g., the mold surface 48) and further molecularly orienting the polyester material in a direction generally perpendicular to the axial direction, thus establishing the biaxial molecular orientation of the polyester material in most of the plastic container 10. The pressurized air holds the mostly biaxial molecularly oriented polyester material against the mold cavity 46 for a period of approximately two (2) to five (5) seconds before removal of the plastic container 10 from the mold cavity 46. This process is utilized to produce containers suitable for filling with product under ambient conditions or cold temperatures.

Alternatively, other manufacturing methods using other thermoplastic materials including, for example, high density polyethylene, polypropylene, polyethylene naphthalate (PEN), a PET/PEN blend or copolymer, polystyrene, polycarbonate, nylon, K-resin, acrylonitrile, butadiene styrene (ABS), polyphenylene Oxide (PPO), polylactic acid (PLA) and various multilayer structures may be suitable for the manufacture of the plastic container 10. Those having ordinary skill in the art will readily know and understand plastic container manufacturing method alternatives.

Figure 8:
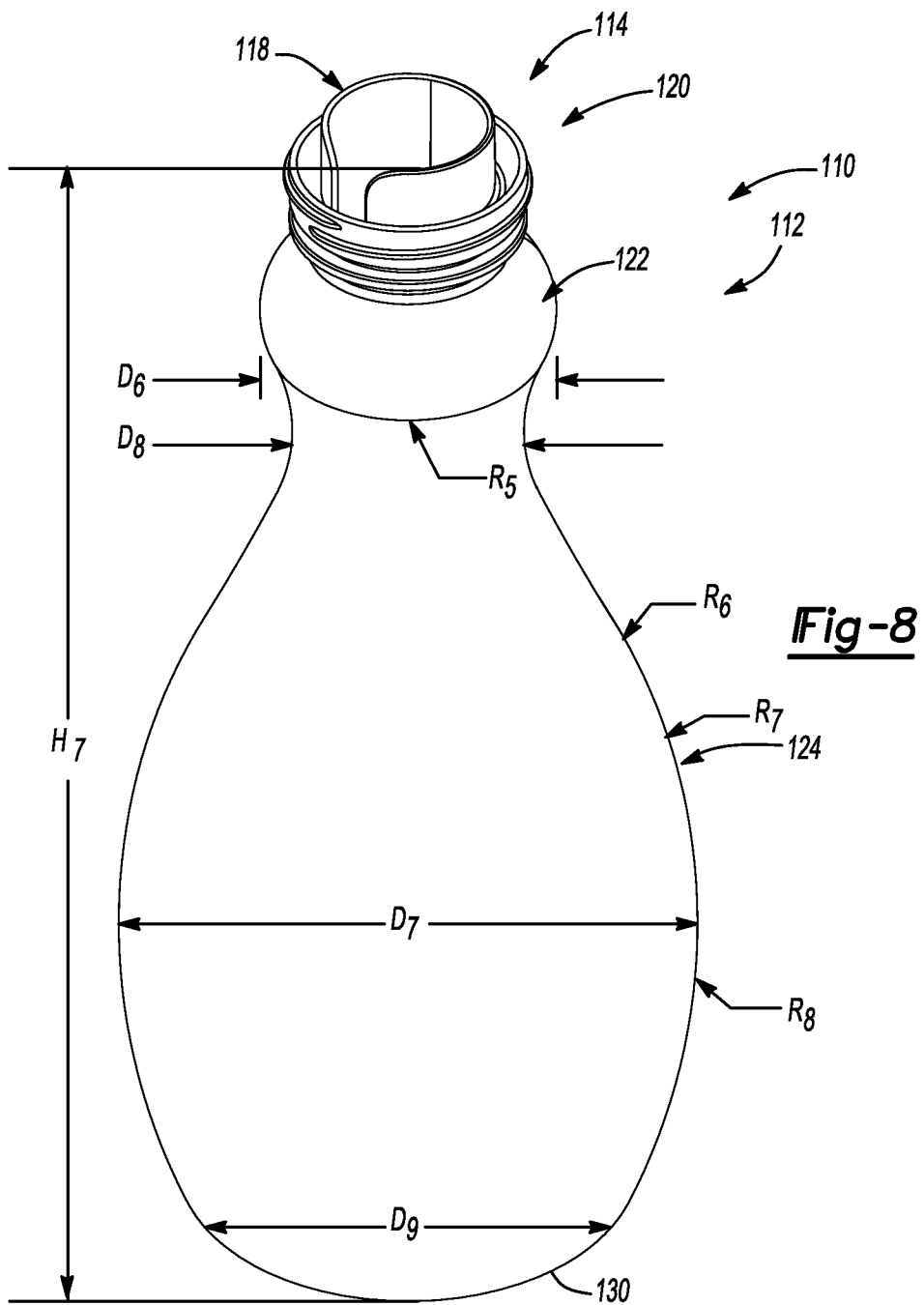
FIG. 8 is a side view of an upper portion of a container constructed in accordance with additional features of the present disclosure.

With reference now to FIG. 8, another one-piece plastic, e.g. PET container 110 according to additional features is shown. The plastic container 110 generally defines a body 112, and includes an upper portion 114 having a spout 118 and a finish 120, similar to the spout 18 and the finish 20 as described above. The plastic container 110 can be formed by the injection-stretch blow molding process described above. Accordingly, the spout 118 and the finish 120 remain substantially unchanged from their preform state while the container body 112 is formed below the finish 120. The plastic container 110 has an overall height $H_7$ of about 270.74 mm (10.66 inches). The plastic container 110 generally includes a first and a second bulbous portion 122 and 124, respectively. A diameter $D_6$ of the plastic container 110 taken at the first bulbous portion 122 may be 61.93 mm (2.44 inches). A diameter $D_7$ of the plastic container 110 taken at the second bulbous portion 124 may be 121.62 mm (4.79 inches). A diameter $D_8$ of the plastic container 110 taken at a transition between the first and second bulbous portions 122 and 124 may be 48.5 mm (1.91 inch). A diameter $D_9$ of the plastic container 110 taken at a base 130 may be 85.32 mm (3.36 inches). A radius $R_5$ may be 56.03 mm (2.21 inches). A radius $R_6$ may be 732.54 mm (28.84 inches). A radius $R_7$ may be 152.67 mm (6.01 inches). A radius $R_8$ may be 161.58 mm (6.36 inches).

FIGS. 9-14 show another one-piece plastic container 210 constructed in accordance with the teachings of the present disclosure. As previously mentioned, it should be understood that throughout the drawings, corresponding reference numerals indicate like or corresponding features. As with the plastic container 10, the plastic container 210 defines the body 12 and includes, but is not limited to, the neck 32, the support ring 86, the shoulder region 22, the sidewall portion 24, the base portion 28 and the base 30. Similar to the plastic container 10, the plastic container 210 is an injection-stretch blow molded, biaxially oriented container with a unitary construction from a single or multi-layer material which can be formed by the injection-stretch blow molding processes described above, such as, but not limited to, heat setting and/or the process utilized to produce containers suitable for filling with a commodity under ambient conditions or cold temperatures. Similar to the plastic container 10, the plastic container 210 is designed to retain a commodity. The commodity may be a liquid and may be introduced into the plastic container 210 during a thermal process, typically a hot-fill process, or other high-temperature pasteurization or retort filling processes as well. The commodity may also be introduced into the plastic container 210 under ambient temperatures.

Figure 9:
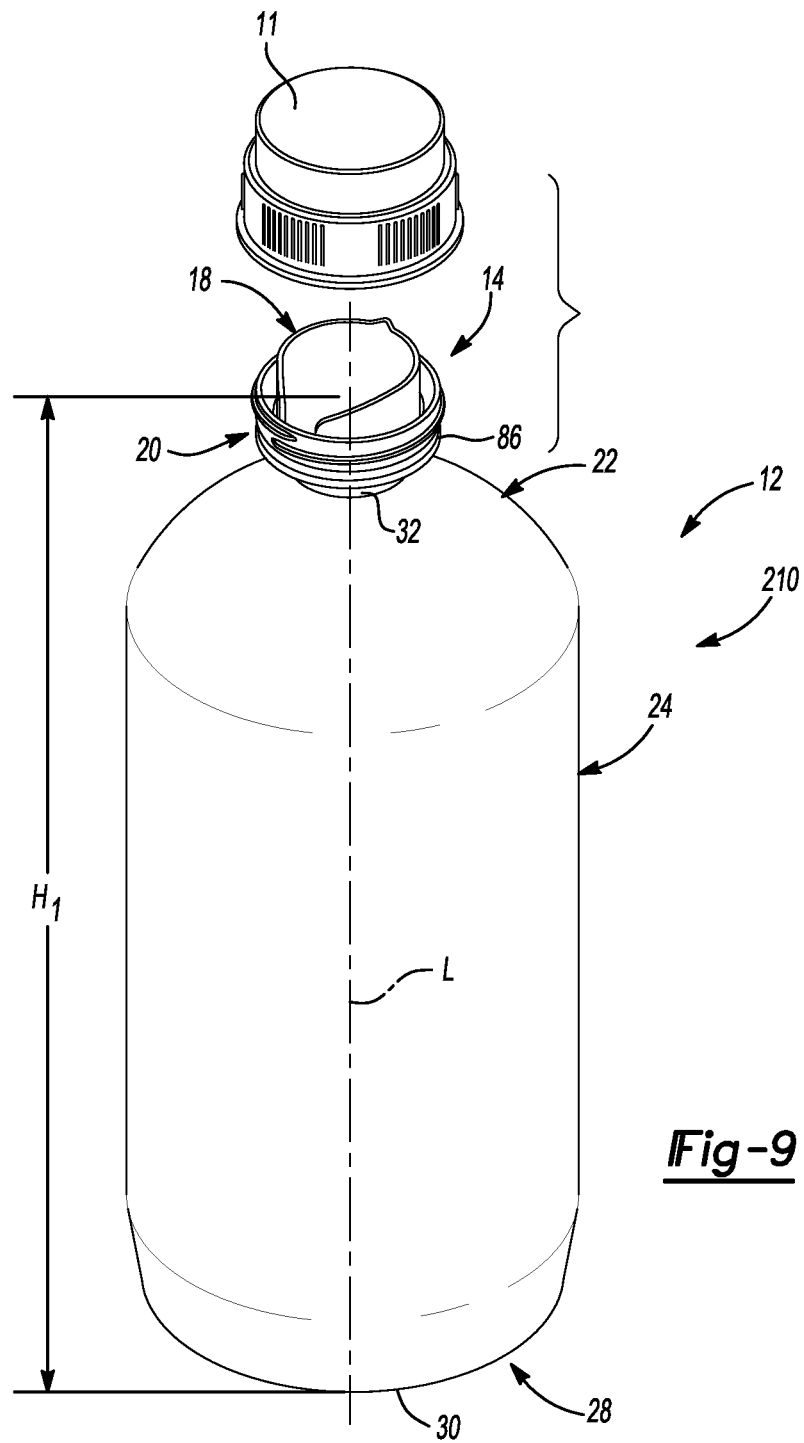
FIG. 9 is a side elevational view of another one-piece plastic container constructed in accordance with the teachings of the present disclosure and shown with an exemplary cap.

As with the plastic container 10, the manufacture of the plastic container 210 involves a preform 234 (FIG. 10) of a polyester material, such as polyethylene terephthalate (PET), having a shape well-known to those skilled in the art similar to a test-tube with a generally cylindrical cross section and a length typically approximately fifty percent (50%) that of the resultant container height. In one example, similar to the preform 34, the preform 234 can be injection molded. As with the preform 34, the preform 234 includes, but is not limited to, the neck-forming region 36, the shoulder-forming region 38, the sidewall-forming region 40, and the base-forming region 42. The neck-forming region 36, the shoulder-forming region 38, the sidewall-forming region 40 and the base-forming region 42 are all expanded in a mold cavity to create the neck 32, the shoulder region 22, the sidewall portion 24, and the base portion 28 of the resultant plastic container 210, respectively, as depicted in FIG. 9.

Container 210 differs primarily from the container 10 in the nature, design and construction of the upper portion. The plastic container 210 according to the present disclosure includes an upper portion 214 having a spout 218 and a finish 220. As will be appreciated, the upper portion 214 (i.e., the spout 218 and the finish 220), remains substantially unchanged from its preform state while the container body 12 is formed below the finish 220. For reference purposes, features of the upper portion 214 have been described interchangeably for the plastic container 210 and the preform 234. As mentioned, the upper portion 214 including the spout 218 and the finish 220, of the preform 234 remains substantially unchanged during blowing, filling and shipping operations.

The upper portion 214 will now be further described. The spout 218 includes an upper rim or terminal lip 252 that defines an opening 250 into the preform 234 (and likewise into the resultant plastic container 210), and a radial wall 224 at an end of which forms the terminal lip 252. The preform 234 and the container 210 both may have a spout that is different in shape, location and dimension from the preform 34 and the container 10. That is, the spout 218 may have a larger inside diameter than the spout 18 depicted in FIG. 1. The spout 218 may, although generally cylindrical in shape, have the terminal lip 252 from which a fluid such as a liquid may exit the container 210 when container 210 is tilted from a vertical position to facilitate flow of the liquid from the container 210 via the terminal lip 252. The terminal lip 252 may further include a terminal pour location 253, which may protrude beyond the plane or surface of the radial wall 224. Thus, the terminal pour location 253 may be protruding such that it protrudes from an outer surface of a cylindrical radial wall that forms the spout 218. The terminal pour location 253 may be molded within the radial wall 224 such that it is diametrically opposed to a longitudinal slot 280 formed on the spout 218. That is, a straight line drawn through a center of longitudinal slot 280 may pass through a center point 254 of the terminal pour location 253.

Terminal pour location 253 may be formed or molded into a variety of different shapes that are part of the radial wall 224. More specifically, terminal pour location 253 may be molded into a single semi-circular, curved or rounded shape. Alternatively, terminal pour location 253 may be molded into a single square-like or rectangular shape, that is, terminal pour location 253 may have three straight sides that meet at ninety degree angles to form a single semi-square or rectangular shape that protrudes from spout 218. Still yet, terminal pour location 253 may be a molded protrusion in the shape of dual triangles. That is, when viewed from a top view, the protrusion may be or may look like two triangles butted together in a side-by-side fashion with a "V" shape opening between the triangles. Still yet, terminal pour location 253 may be molded into a single semi-circular, curved or rounded shape with a "V" formed into it such that a longitudinal centerline of the "V" bifurcates the semi-circular, curved or rounded shape. In addition to the different terminal pour locations discussed above, one skilled in the art may realize that a variety of terminal pour locations are possible. Different shapes of terminal pour locations provide different pouring characteristics depending upon the commodity or liquid being poured.

Figure 4:
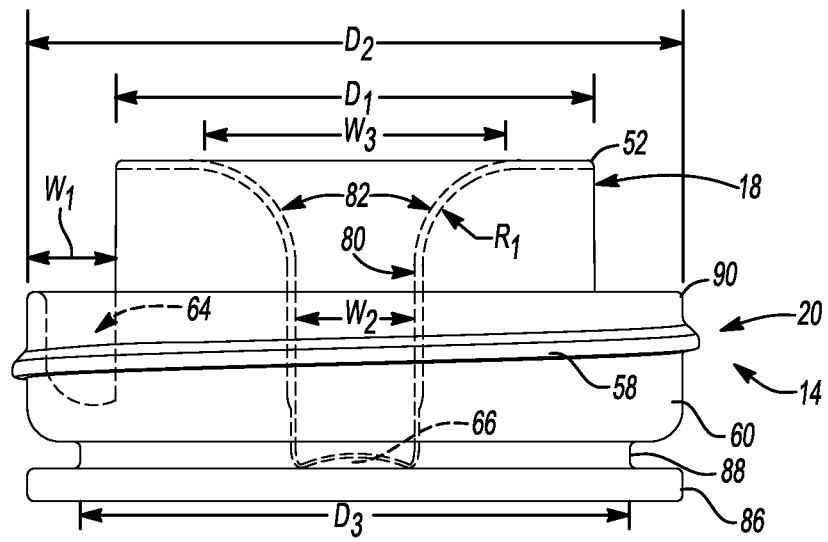
FIG. 4 is a detail side view of an upper portion of the one-piece plastic container of FIG. 1, the upper portion including a finish and a spout.
Figure 11:
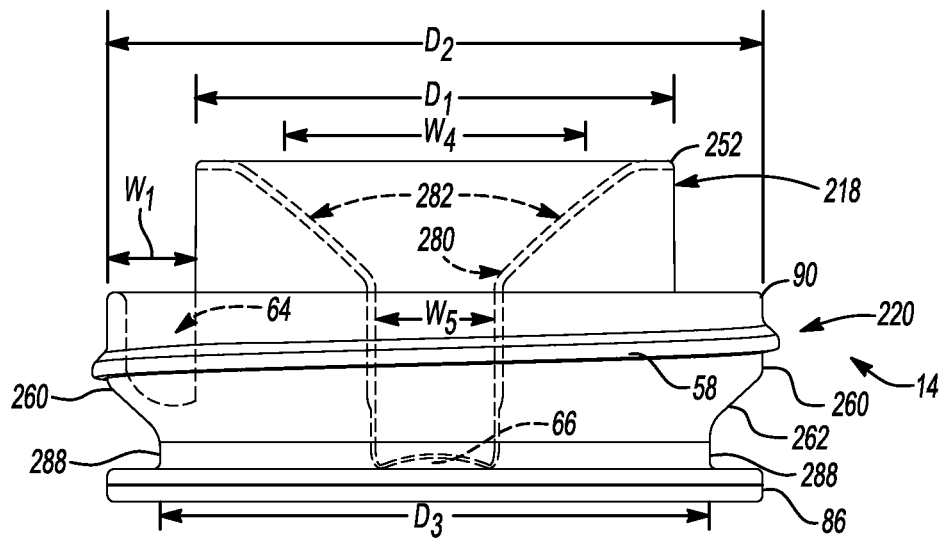
FIG. 11 is a detail side view of an upper portion of the other one-piece plastic container of FIG. 9, the upper portion including a finish and a spout.
Figure 14:
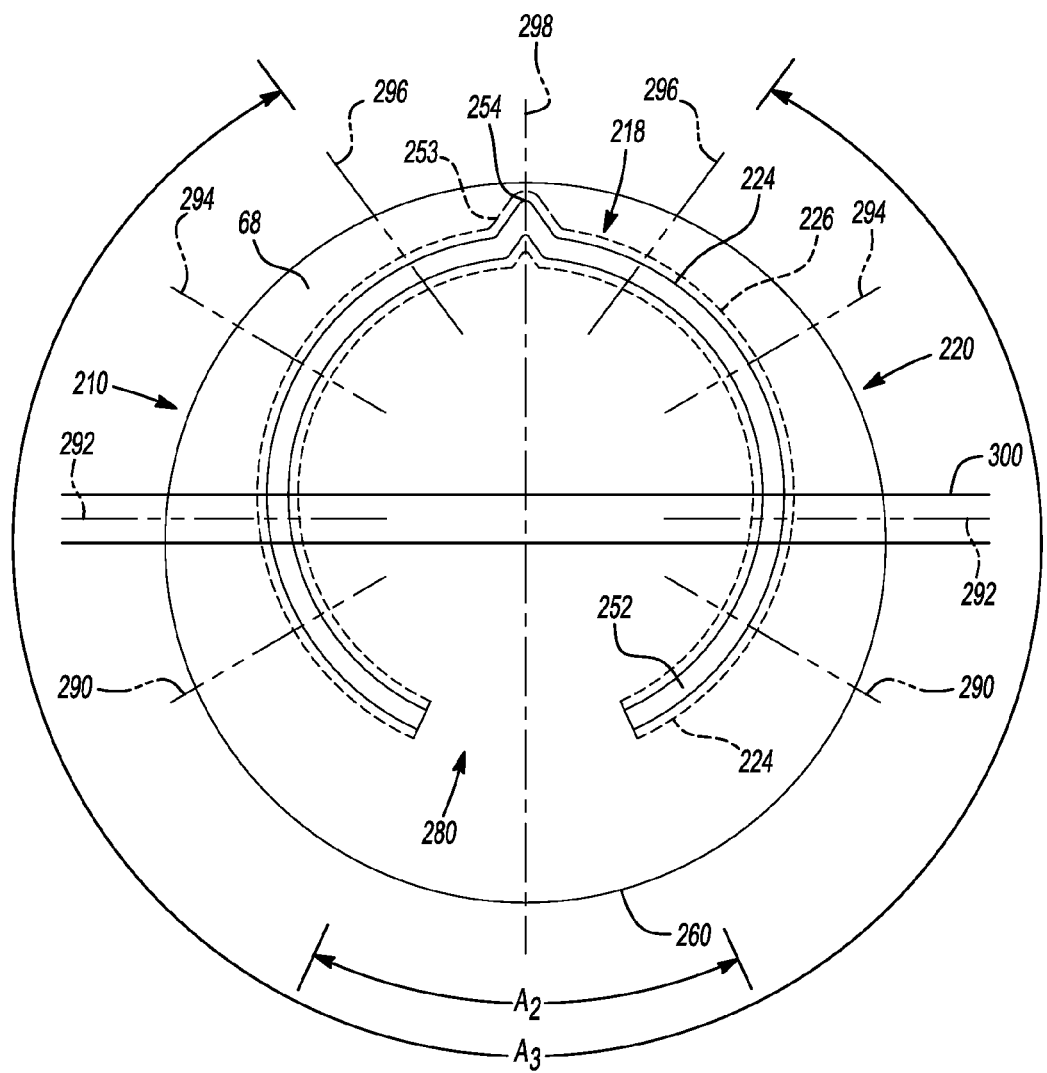
FIG. 14 is top view of the finish and spout of the other one-piece plastic container of FIG. 9.

With reference now including FIG. 11, a width $W_4$ taken at the transition from the terminal lip 252 to the arcuate surfaces 282 may be greater than 25 mm (0.98 inch), which may be greater than a dimension of $W_3$ as discussed in conjunction with FIG. 4. Thus, a ratio of $W_4$ to $D_1$ of FIG. 11 may be greater than a ratio of $W_3$ to $D_1$ of FIG. 4. Moreover, arcuate surfaces 282 may have different radii than that of arcuate surfaces 82 of FIG. 4. A radius $R_5$ of the arcuate surfaces 282 may be greater than 8 mm (0.32 inch), as recited for radius $R_1$ of the arcuate surfaces 82 of FIG. 4. Thus, in relative comparison, the material necessary to form the spout 218 of FIG. 11 may be less than that of spout 18 depicted in FIG. 4. To further reduce material necessary to make spout 218, a width $W_5$ between arcuate surfaces 282 may be increased so as to form a more "open" spout 218, that is, a spout with more open area than a spout that may have no width dimension, such as a spout with no $W_1$ or $W_5$ dimension. FIG. 14 is a top view of a container 210 depicting angles $A_2$ and $A_3$ to which spout 218 may be manufactured. More specifically, Angle $A_2$ may be a 10 degree angle formed by lines extended from mirror image end surfaces or portions of spout 218 that intersect at a center of spout 218. This may also be referred to as a 10 degree longitudinal slot 280. Varying the angle between lines that are extended from mirror image end portions of spout 218 and that pass through a spout center may save material to manufacture spout 218 yet preserve the function provided by spout 218. More specifically, angle $A_3$ may be a 330 degree angle formed by lines 296 extended from mirror image end surfaces or portions of spout 218 and that pass through a center of spout 218. That is, the spout 218 may occupy 15 degrees of a circular spout region on each side of a centerline 298 that bifurcates center point 254. Another way of referring to such a construction is as a 330 degree longitudinal slot because the slot is bifurcated by centerline 298. An advantage of the construction of spout 218 with angle $A_3$ is that less material, such as PET, may be used than if a spout construction using a smaller angle is used.

Figure 12:
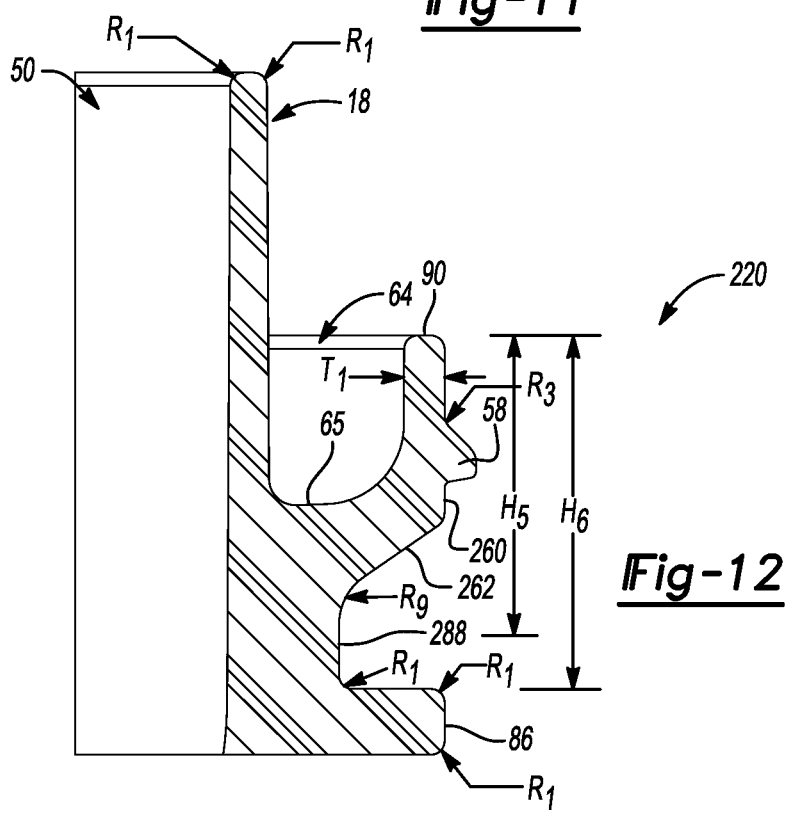
FIG. 12 is a sectional view of the upper portion taken along line 12-12 of FIG. 10.

Turning to FIG. 12, a section of a finish 220 of the container 210 is depicted in which a radial channel 288 between an annular sidewall 260 and the support ring 86 is molded in a different configuration than the annular sidewall 60 and the radial channel 88 depicted in FIG. 4. More specifically, as depicted in FIG. 4, the annular sidewall 60 employs a vertical wall and a horizontal wall that are blended with a radius, $R_1$. The terms "vertical" and "horizontal" are being used as if the finish 20 of the container 10 is resting upright on a flat surface, such as a top of a table, with its base 30 being in contact against the flat surface. Thus, without radius $R_1$, the vertical wall of the annular sidewall 60 would otherwise intersect with the horizontal wall at ninety degrees. The embodiment of FIG. 12 depicts an annular sidewall 260 that employs a vertical wall that is blended with a radius into a diagonal wall 262 that leads to, and blends into, the radial channel 288 with a radius $R_9$. An advantage of the construction of finish 220 depicted in FIGS. 11 and 12 is that less material, such as PET, may be used than if the construction of finish 20 that is depicted in FIG. 4 is used, while maintaining similar or in some situations, equal performance characteristics.

Figure 10:
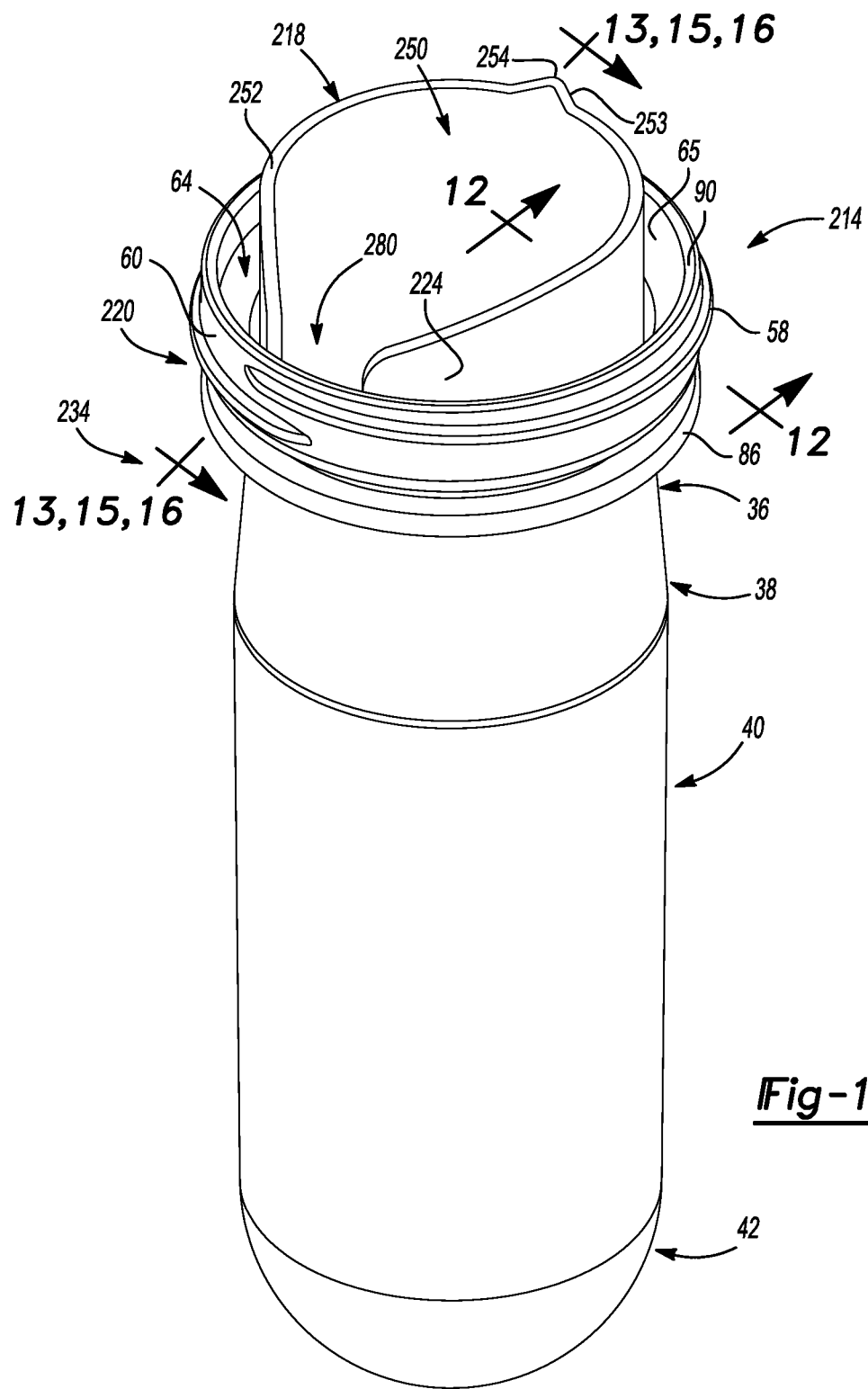
FIG. 10 is a perspective view of a preform used for construction of the one-piece plastic container of FIG. 9.
Figure 13:
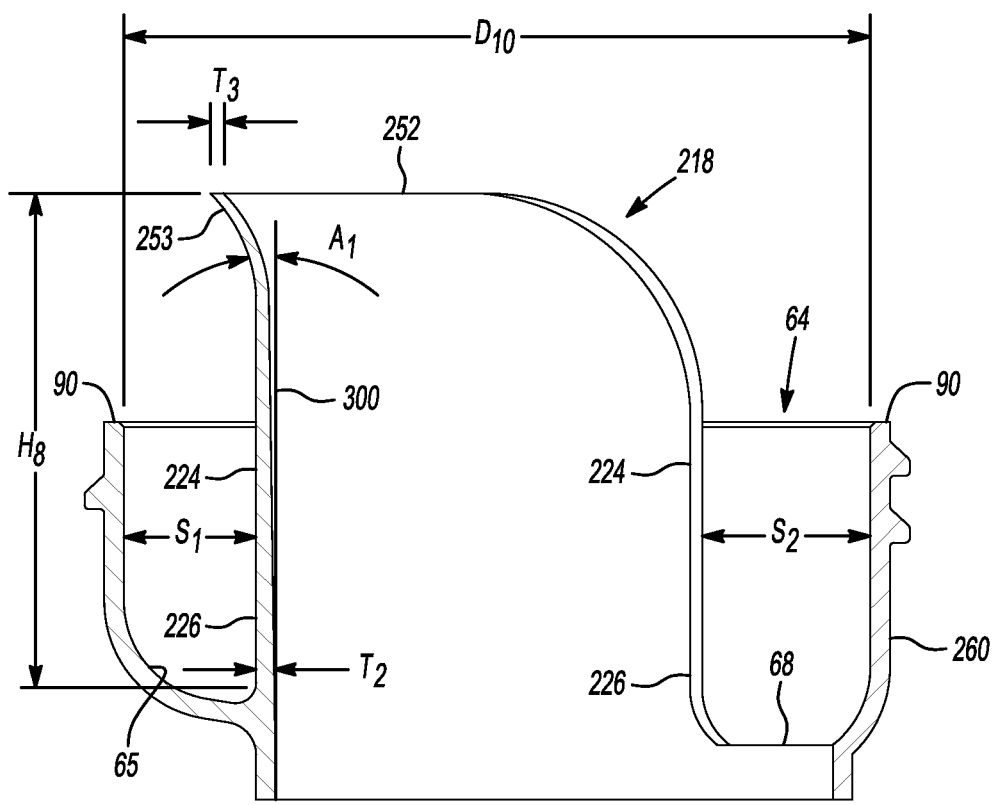
FIG. 13 is a sectional view of the upper portion taken along line 13-13 of FIG. 10.

FIG. 13 depicts a sectional view of the upper portion taken along line 13-13 of FIG. 10. Because the cross-section depicted in FIG. 13 is taken through longitudinal slot 280 and a center point 254 of the terminal pour location 253, part of the radial wall 224 is not depicted in cross-section since it may be seen in this view, but not all portions of the radial wall 224 are seen in cross-section. The radial wall 224 may be a tapered wall that decreases in thickness from its base area 226 near trough 64 to its terminal lip 252. Such a decrease in thickness includes an entire periphery of terminal lip 252, including the terminal pour location 253. An advantage of the spout 218 of FIG. 13 compared to a container without a spout with a radial wall of decreasing thickness, with all else being equal, is that less material is necessary for molding of the spout 218. Example dimensions of the radial wall 224 may be a thickness dimension $T_2$ of 0.020"-0.090" at the base 226 and a thickness dimension $T_3$ of 0.010"-0.080" at the terminal lip 252. Thus, the thickness at the terminal lip 252 may be the same as the thickness of the terminal pour location 253 since the terminal pour location 253 is a portion or specific location of the terminal lip 252. The spout 218 may have a height $H_8$ of 0.125"-4.000" as measured from a location near or at a base of trough 68, such as where annular sidewall 260 meets radial wall 224.

FIG. 13 also depicts angle $A_1$, which may be a draft angle at which the radial wall 224 may be molded relative to a vertical plane 300. When the radial wall 224 is molded, release and extraction of an injector core used in the molding process may be accomplished with reduced effort or force compared to a situation in which a draft angle is zero, for example. As an example, draft angle $A_1$ may be in a range from 1-5 degrees.

Another advantage of the embodiment of FIG. 13 is that the spout 218, including its outside diameter, may be located off-center relative to a diameter $D_{10}$ that spans an outside diameter of trough 68, which is located about an entire periphery of spout 218. In other words, a dimension $S_1$ may be less than a dimension $S_2$ for the cross-section depicted in FIG. 13. An advantage of such a location or position of spout 218 is that when liquids are poured from the terminal pour location 253 of the spout 218, an increased volume of liquid will pass over and past a top 90 of the annular sidewall 260. Another advantage to an off-center position of the spout 218 relative to the inside diameter $D_{10}$ of the annular sidewall 260 is that a reduced volume of liquid material will fall into an interior of container 210, than if spout 218 is centered relative to diameter $D_{10}$ when the container 210 and the spout 218 are tilted into a pouring position and then tilted back to a nonpouring position. The trough 68 depicted in FIG. 13 defines a passage from the trough 68 into the interior volume or body of the container 210 for passage of liquid. An outside diameter of the spout 218 may be positioned off-center relative to an inside diameter $D_{10}$ of the finish portion that defines an outer perimeter of the trough 68 about the spout 218.

FIG. 14 is top view of the finish 220 and the spout 218 of the one-piece plastic container 210. As discussed above, the spout 218 may be off-center or offset with respect to an outside diameter $D_2$ of finish 220 (FIG. 11) and with respect to an inside diameter $D_{10}$ of finish 220 (FIG. 13). In FIG. 14, an advantage of the disclosure is evident. The advantage is that because the spout 218 is closer to the annular sidewall 260 due to the location of the spout 218 being non-coincidental with a diameter of the annular sidewall 260, liquid content of container 210 is less likely to spill into trough 68 and onto the radial wall 224. To the contrary the liquid content is more likely to drip or spill outside of container 210, thus completely clearing all structures of container 210, and toward and onto the place of the intended pouring of the liquid content. Thus, dripping below terminal lip 252 and below terminal pour location 253 is reduced or eliminated.

FIG. 14 also depicts another advantage of the disclosure, which is to reduce the circumferential size of the spout 218. More specifically, spout may be molded to terminate or end at specific circumferential locations from terminal pour location 253. The spout 218 and the finish may be symmetric about a centerline 298 that bifurcates terminal pour location 253 and the longitudinal slot 280. Thus, to provide a spout in accordance with a given container size, the spout 218 may be terminated at symmetrical positions prescribed at specific locations as measured in a clockwise and a counterclockwise fashion from the terminal pour location 253 relative to a radial wall 224 center. As examples, the radial wall 224 may be terminated at 30 degrees, 60 degrees, 90 degrees, 120 degrees as measured in a clockwise and a counterclockwise direction from the terminal pour location 253 relative to a radial wall 224 center. Although 30, 60, 90 and 120 degrees are noted as examples, the actual number of degrees may be any number or fraction depending upon the container size, liquid to be poured, etc. As such, the opening may be dependent on the viscosity of the commodity within the container 210. Commodities that are more viscous will enjoy a smaller opening, while less viscous commodities will enjoy a larger opening. Thus, by centering a circular spout at line 300, closer to a pouring location, instead of at line 292, which may be a center of annular sidewall 260 of finish 220 and farther from a pouring location, an improvement in pouring may be realized. Moreover, by terminating or truncating radial wall 224 at specific locations relative to a transverse container centerline through terminal pour location 253, a reduction in material usage for spout 218 may be achieved.

Figure 15:
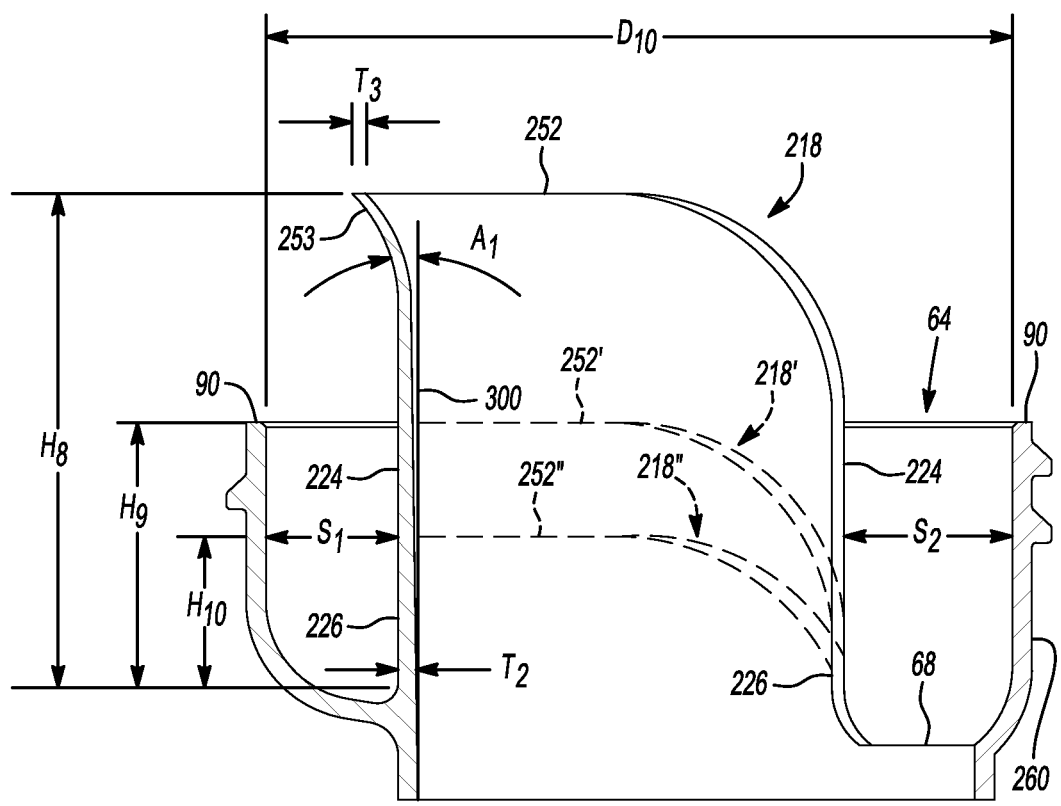
FIG. 15 is a sectional view of the upper portion taken along line 15-15 of FIG. 10 and depicting multiple positions of a spout.

With reference now including FIG. 15, various positions and corresponding advantages of the spout 218 will be presented. FIG. 15 depicts the spout 218 with the terminal lip 252 located at a position $H_8$ that is above the top 90 of the radial wall 224. However, the terminal lip 252 of the spout 218 may be located at different positions. For example, a terminal lip 252' of a spout 218' may be located at height $H_9$, which may be the same height, level or position as the top 90 of the radial wall 224. Thus, at least a portion of the terminal lip 252' of the spout 218' may be parallel to a surface upon which a flat base 30 of container 210 may reside when container 210 resides in an upright, vertical position. Another portion of the terminal lip 252' of the spout 218' may be curved and not parallel to a surface upon which the flat base 30 of container 210 may contact when container 210 is in an upright position. Positioning of the terminal lip 252 in still other positions is possible. A terminal lip 252" of a spout 218" may be located at height $H_{10}$, which may be a height lower than or below the top 90 of the radial wall 224. Thus, at least a portion of the terminal lip 252" of the spout 218" may be parallel to a surface upon which a flat base 30 of container 210 may reside when container 210 resides in an upright, vertical position. Another portion of the terminal lip 252" of the spout 218" may be curved and not parallel to a surface upon which the flat base 30 of container 210 may contact when container 210 is in an upright position.

There are multiple advantages of the terminal lip 252' of the spout 218' being at a level of the top 90 of the radial wall 224 and the terminal lip 252" of the spout 218" being below or lower than a level of the top 90 of the radial wall 224. For instance, lower or shorter terminal lips 252, 252', 252" require less material in manufacturing spouts 218, 218', 218", respectively. Moreover, the lower or shorter the terminal lip 252, 252', 252" is, the less likely a liquid commodity is to drip onto the annular sidewall 260, including a thread or threads located on an outside surface of the annular sidewall 260, when a container 210 employing the terminal lip 252, 252', 252" is placed into a vertical position, such as immediately after the pouring of a liquid commodity from a tilted position. Moreover, any portion of liquid commodity that may drip from the terminal pour location 253 of any spout 218, 218', 218", is more likely to drip into the trough 68 and subsequently back into an interior of container 210 as the spout 218, 218', 218" becomes shorter. A shorter spout has the terminal lip 252, 252', 252" closer to the trough 68. As presented above in connection with the spout 218, the distance $S_1$ may be less than the distance $S_2$ for spouts 218' and 218" to better accommodate pouring by controlling any dripping of a commodity, as explained above in conjunction with the various heights of the spouts 218, 218', 218".

Figure 16:
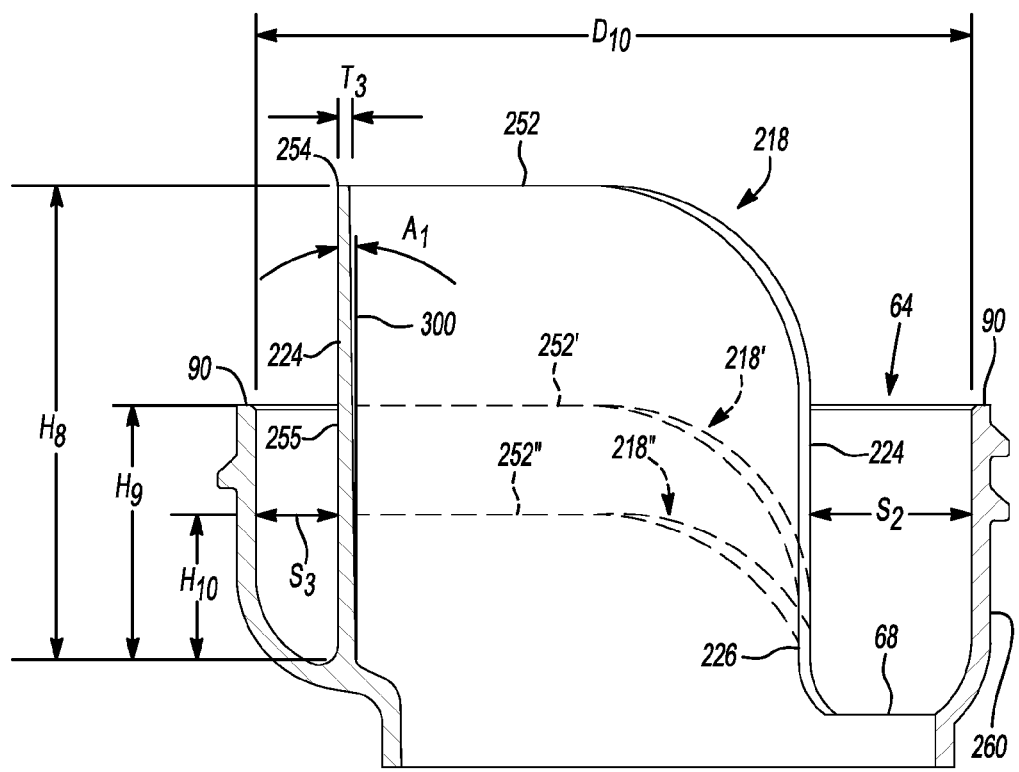
FIG. 16 is a sectional view of the upper portion taken along line 16-16 of FIG. 10 and depicting a protruding terminal lip that extends along a spout length.

FIG. 16 depicts a sectional view of another configuration of spout 218 and is a sectional view of the upper portion taken along line 16-16 of FIG. 10. FIG. 16 depicts a protruding terminal lip that may protrude away from radial wall 224 for an entire height $H_8$ of spout 218. Although the top view of spout 218 of FIG. 14 still applies to the embodiment of FIG. 16, a protruding wall 255 may protrude from radial wall 224 beginning at terminal pour location 253 and may extend or run to trough 68 at which juncture a radius is formed to blend or smooth protruding wall 255 with trough 68. Protruding wall 255 may be considered a part of radial wall 224 since protruding wall 255 accounts for part of a structure or surface of radial wall 224. Protruding wall 255 may have a radius at an outside and inside surface of spout 218, as depicted in FIG. 14 where bifurcating line 298 passes through terminal pour location 253. Because protruding terminal lip 252 may run directly to trough 68 from a top edge of spout 218 instead of tapering inward as depicted in FIG. 15, a distance $S_3$ of FIG. 16 may be less than a distance $S_1$ of FIG. 15.

While the above description constitutes the present disclosure, it will be appreciated that the disclosure is susceptible to modification, variation and change without departing from the proper scope and fair meaning of the accompanying claims.

What is claimed is:

1. A one-piece plastic container comprising:
a body defining a longitudinal axis and having an upper portion, a sidewall portion and a base portion, said upper portion having a spout generally defined by a cylindrical radial wall, said spout defining an opening into the container, said upper portion also including a finish offset radially outwardly from said spout, wherein a trough is formed at a transition between said finish and said spout, said trough defining a passage into said body, an outside diameter of said cylindrical radial wall and an inside diameter of said finish being off-center relative to each other, and wherein said sidewall portion is integrally formed with and extends from said upper portion to said base portion, said base portion closing off an end of the container; and a protruding terminal pour location, wherein said protruding terminal pour location protrudes from an outer surface of said cylindrical radial wall:

wherein said spout includes a terminal lip, an entirety of the terminal lip lying substantially within a plane that extends generally perpendicular to said longitudinal axis;

wherein said spout includes a first end wall and a second end wall spaced apart from the first end wall to define a longitudinal slot therebetween;

wherein said trough slopes toward said passage and defines a non-orthogonal angle relative to said longitudinal axis;

wherein said trough defines a first angle relative to a transverse line perpendicular to said longitudinal axis and drawn through the container from said longitudinal axis to said passage, and a second angle relative to the transverse line from said longitudinal axis to a diametrically opposed point relative to the passage, wherein said first angle is greater than said second angle; and wherein the one-piece plastic container is an injection-stretch blow molded, biaxially oriented container with a unitary construction, the one-piece plastic container blow molded from a preform including the upper portion, the sidewall portion, and the base portion closing off an end of the preform.

2. The one-piece plastic container of claim 1 wherein said finish defines a means for attaching a closure thereon.

3. The one-piece plastic container of claim 2 wherein said means for attaching a closure includes at least one thread.

4. The one-piece plastic container of claim 3 wherein said at least one thread is formed on an outer diameter of said finish.

5. The one-piece plastic container of claim 1 wherein said terminal lip is offset entirely above said finish in a direction away from said base.

6. The one-piece plastic container of claim 1 wherein said longitudinal slot extends from said terminal lip to said passage.

7. The one-piece plastic container of claim 6, further comprising at least one arcuate surface defined at a transition from said terminal lip to said longitudinal slot.

8. The one-piece plastic container of claim 1 wherein said first angle is substantially about 10 degrees and said second angle is substantially about 2 degrees.

9. The one-piece plastic container of claim 1 wherein the cylindrical radial wall has a base portion cross-sectional thickness at a base portion and tapers to a terminal lip portion cross-sectional thickness that is less than said base portion cross-sectional thickness.

10. The one-piece plastic container of claim 9, wherein the cylindrical radial wall includes an inner surface opposite to the outer surface of the cylindrical radial wall, the inner surface is tapered outward away from the longitudinal axis.

11. The one-piece plastic container of claim 10, wherein the inner surface is tapered outward and away from the longitudinal axis at a draft angle in a range from 1-5 degrees.

12. The one-piece plastic container of claim 10, wherein the outer surface tapers inward towards the inner surface.

13. The one-piece plastic container of claim 10, wherein between the base portion and the terminal lip portion the outer surface extends parallel to the longitudinal axis and is not tapered.

14. The one-piece plastic container of claim 1 wherein the cylindrical radial wall has a base portion cross-sectional thickness at a base portion that is equal in thickness to a terminal lip portion cross-sectional thickness.

15. The one-piece plastic container of claim 1 wherein said spout has a height in a range from 0.125" to 4.000", inclusive, as measured from a base of trough.

16. The one-piece plastic container of claim 9 wherein said sidewall portion and said base portion are both biaxially oriented.

17. The one-piece plastic container of claim 1 wherein said spout has a longitudinal slot ranging from 10 degrees to 330 degrees, inclusive.

18. The one-piece plastic container of claim 1 said finish further comprising an annular sidewall and said spout further comprising a terminal lip, wherein a portion of said terminal lip protrudes above a top of said annular sidewall.

19. The one-piece plastic container of claim 1 said finish further comprising an annular sidewall and said spout further comprising a terminal lip, wherein a portion of said terminal lip is at a same height as a top of said annular sidewall.

20. The one-piece plastic container of claim 1 said finish further comprising an annular sidewall and said spout further comprising a terminal lip, wherein a portion of said terminal lip is at a height lower than a top of said annular sidewall.

21. The one-piece plastic container of claim 1, wherein the protruding terminal pour location terminates at a terminal lip, the protruding pour location having generally a V-shape at the terminal lip.

22. A one-piece plastic container comprising:
an upper portion comprising:
a spout defining an opening into the container, said spout including a first end wall and a second end wall spaced apart from the first end wall to define a longitudinal slot therebetween, said spout terminating at a terminal lip; and
a finish offset radially outwardly from said spout;
wherein a trough is formed at a transition between said finish and said spout, said trough defining a passage into said body;
a shoulder region integrally formed with and extending from said upper portion;
a sidewall portion defining a longitudinal axis and extending from said shoulder region to a base portion, said base portion closing off an end of the container and defining a first plane; and
a protruding terminal pour location defined on the terminal lip, wherein said protruding terminal pour location protrudes from an outer cylindrical surface of said spout,
wherein said protruding terminal pour location and at least a portion of the terminal lip adjacent to, and extending from opposite sides of, the protruding terminal pour location lie within a second plane that is generally parallel to said first plane;
wherein said trough slopes toward said passage and defines a non-orthogonal angle relative to said longitudinal axis;
wherein said trough defines a first angle relative to a transverse line perpendicular to said longitudinal axis and drawn through the container from said longitudinal axis to said passage, and a second angle relative to the transverse line from said longitudinal axis to a diametrically opposed point relative to the passage, wherein said first angle is greater than said second angle; and wherein the one-piece plastic container is an injection-stretch blow molded, biaxially oriented container with a unitary construction, the one-piece plastic container blow molded from a preform including the upper portion, the sidewall portion, and the base portion closing off an end of the preform.

23. The one-piece plastic container of claim 22 wherein an outside diameter of said spout is positioned off-center relative to an inside diameter of said finish that defines an outer perimeter of said trough about said spout.

24. The one-piece plastic container of claim 22 wherein said finish defines a means for attaching a closure thereon.

25. The one-piece plastic container of claim 22 wherein said means for attaching a closure includes at least one thread.

26. The one-piece plastic container of claim 23 wherein said at least one thread is formed on an outer diameter of said finish.

27. The one-piece plastic container of claim 22 wherein said terminal lip is offset entirely above said finish in a direction away from said base.

28. The one-piece plastic container of claim 27 wherein said longitudinal slot extends from said terminal lip to said passage.

29. The one-piece plastic container of claim 28 further comprising at least one arcuate surface defined at a transition from said terminal lip to said longitudinal slot.

30. The one-piece plastic container of claim 22, wherein the protruding pour location has generally a V-shape at the terminal lip.

31. The one-piece plastic container of claim 22, wherein the spout has a base portion cross-sectional thickness at a base portion and tapers to a terminal lip portion cross-sectional thickness that is less than said base portion cross-sectional thickness, the spout further includes an inner cylindrical surface that is opposite to an outer cylindrical surface.

32. The one-piece plastic container of claim 31, wherein the inner cylindrical surface is tapered outward and away from the longitudinal axis at a draft angle in a range from 1-5 degrees.

33. The one-piece plastic container of claim 31, wherein the outer cylindrical surface tapers inward towards the inner surface.

34. The one-piece plastic container of claim 31, wherein between the base portion and the terminal lip portion the outer surface extends parallel to the longitudinal axis and is not tapered.

35. A preform adapted to be molded into a one-piece plastic container, the preform comprising:
a body defining a longitudinal axis and having an upper portion, a sidewall portion and a base portion closing off an end of the preform, said upper portion having a spout defining an opening into said preform and a finish offset radially outwardly from said spout, said spout including a first end wall and a second end wall spaced apart from the first end wall to define a longitudinal slot therebetween, said spout terminating at a terminal lip, wherein a trough is formed at a transition between said finish and said spout, said trough defining a passage into said body; and
a protruding terminal pour location defined on the terminal lip, wherein said protruding terminal pour location protrudes from an outer cylindrical surface of said spout,
wherein said protruding terminal pour location and at least a portion of the terminal lip adjacent to, and extending from opposite sides of, the protruding terminal pour location lie within a first plane that is generally perpendicular to the longitudinal axis;
wherein said finish includes a cylindrical sidewall with a top portion, a second plane extends across the top portion, the second plane is generally parallel to the first plane;
wherein said trough slopes toward said passage and defines a non-orthogonal angle relative to said longitudinal axis;
wherein said trough defines a first angle relative to a transverse line perpendicular to said longitudinal axis and drawn through the preform from said longitudinal axis to said passage, and a second angle relative to the transverse line from said longitudinal axis to a diametrically opposed point relative to the passage, wherein said first angle is greater than said second angle;
wherein the preform is adapted to be injection-stretch blow molded into the one-piece plastic container having a unitary construction and biaxially oriented;
wherein the spout has a base portion cross-sectional thickness at a base portion, the spout tapers to a terminal lip portion cross-sectional thickness that is less than said base portion cross-sectional thickness;
wherein an inner cylindrical surface of the spout is tapered outward and away from the longitudinal axis at a draft angle in a range from 1-5 degrees; and
wherein the outer cylindrical surface of the spout tapers inward towards the inner surface.

36. The preform of claim 35 wherein an outside diameter of said spout is positioned off-center relative to an inside diameter of said finish that defines an outer perimeter of said trough about said spout, and said trough slopes toward said passage and defines a non-orthogonal angle relative to said longitudinal axis.

37. The preform of claim 35 wherein said terminal lip is offset entirely above said finish in a direction away from said base.

38. The preform of claim 37 wherein said longitudinal slot extends from said terminal lip to said passage.

39. The preform of claim 38 further comprising at least one arcuate surface defined at a transition from said terminal lip to said longitudinal slot.

40. The one-piece plastic container of claim 35, wherein the protruding pour location has generally a V-shape at the terminal lip.

* * * * *